United States Patent [19]

Markels, Jr.

[11] Patent Number: 5,564,862

[45] Date of Patent: Oct. 15, 1996

[54] METHOD OF IMPROVED LANDFILL MINING

[76] Inventor: Michael Markels, Jr., 7421 Belmont Landing Rd., Mason Neck, Va. 22079

[21] Appl. No.: 452,089

[22] Filed: May 26, 1995

Related U.S. Application Data

[63] Continuation-in-part of Ser. No. 237,930, May 4, 1994, abandoned.

[51] Int. Cl.⁶ ..................................................... B09B 1/00
[52] U.S. Cl. ........................ 405/129; 405/128; 405/130; 210/747; 210/901
[58] Field of Search .................................. 405/128, 129, 405/130; 588/259, 260; 71/9, 10; 210/747, 901

[56] References Cited

U.S. PATENT DOCUMENTS

| | | | |
|---|---|---|---|
| 3,586,624 | 6/1971 | Larson | 405/129 X |
| 4,323,367 | 4/1982 | Ghosh | 210/901 X |
| 4,838,733 | 6/1989 | Katz | 210/901 X |
| 5,265,979 | 11/1993 | Hansen | 405/129 |
| 5,356,452 | 10/1994 | Fahey | 71/10 |
| 5,362,181 | 11/1994 | DenBesten | 405/129 |
| 5,375,944 | 12/1994 | Kotani et al. | 405/129 |
| 5,429,454 | 7/1995 | Davis et al. | 405/129 |

*Primary Examiner*—George A. Suchfield
*Attorney, Agent, or Firm*—Bacon & Thomas

[57] ABSTRACT

The present invention includes a method of landfill mining which comprises the following steps: (1) converting the landfill to aerobic production by injection of moisture and air, and a raw material such as sewage sludge (if required), and venting of depleted air and moisture, thereby increasing the rate of waste decomposition; (2) excavating the landfill to remove material; (3) separating the removed material to substantially isolate at least one segregated material from the residual material; (4) disposing of at least one segregated material; and (5) returning the residual material to the landfill. The segregated materials preferably include decomposed waste and recyclables, and may also include toxic material and hazardous waste. The rate of aerobic production may be controlled as follows: if the temperature in the landfill becomes too high, then additional air and additional water may be injected to cool the landfill; and if the temperature in the landfill becomes too low, then additional raw material such as sewage sludge may be injected to increase the reaction rate.

18 Claims, 1 Drawing Sheet

METHOD OF IMPROVED LANDFILL MINING

This application is a continuation-in-part of U.S. application Ser. No. 08/237,930 filed May 4, 1994, now abandoned.

BACKGROUND OF THE INVENTION

The field of the invention is increasing the capacity of landfills. The prior art on the processing of solid waste is voluminous. Some examples are described below.

U.S. Pat. No. 1,329,105 discloses an apparatus for working garbage and refuse of towns. The apparatus consists primarily of a rather high building or tower having a number of fermentation chambers. Air conduits extend vertically from the bottom to the top of each chamber. Each conduit has a number of openings to discharge air into the chamber.

U.S. Pat. No. 1,832,179 discloses a plant for treating organic refuse into useful substances by means of a fermentation activated or stimulated by an injection of air into the moistened mass of refuse.

U.S. Pat. No. 2,798,800 discloses a process of comporting municipal refuse. The process contemplates the stacking of unsegregated municipal refuse into an elongated, unconfined pile, which is referred to as a "windrow". The patent discloses that the "windrow" should be tumbled whenever available oxygen within it is reduced to such an extent that it will not support vigorous aerobic action.

U.S. Pat. No. 3,298,821 discloses a method and apparatus for decomposing waste material by aerobic bacterial action wherein optimum conditions for aerobic bacterial activity are approached and anaerobic bacterial activity is suppressed.

U.S. Pat. No. 3,419,377 discloses a method for treating organic and inorganic waste material, which includes a process wherein said material is thoroughly pulverized and then mixed and moistened for initiating fermentation thereof prior to its delivery to a digestor chamber.

U.S. Pat. No. 3,523,012 is a divisional of aforesaid U.S. Pat. No. 3,298,821, and also discloses an apparatus for composting waste material.

U.S. Pat. No. 5,265,979 discloses a high efficiency waste placement system for municipal landfills. This system includes shredding the waste, moisture adjusting the waste, placing the waste in a specific configuration, installing an aeration system in the waste pile, covering the waste pile with a synthetic cover, performing static pile aerobic decomposition (biostabilizing), compacting the waste pile and covering the compacted waste pile with a synthetic cover.

U.S. Pat. No. 5,356,452 discloses a method and apparatus for reclaiming waste material. The patent discloses that after decomposition of waste material has occurred, the resultant material may be removed and separated into useable fractions such as soil and recyclable metals, rubber, glass and plastics, at column 2, lines 27–30.

SUMMARY OF THE INVENTION

The present invention is a method of landfill mining which comprises converting an existing landfill to an aerobic processor, and then excavating the landfill to remove decomposed waste which may be sold or used for a number of purposes. The efficiency of the aerobic processor is related to its content and temperature. The temperature of such a landfill aerobic processor may be controlled by controlling the rate and location of the injection of air, water and a raw material (such as sewage sludge), and the venting of depleted air and moisture. The water that is infected may comprise leachate, which is the aqueous liquid that may be drained from the bottom of the landfill and recycled.

The present invention also includes a method of controlling the temperature in a landfill that comprises selectively injecting air, water and possibly a raw material (such as sewage sludge), and selectively venting depleted air and moisture. The selection includes rate and location. The water that is injected may comprise leachate, which is the aqueous liquid that may be drained from the bottom of the landfill and recycled.

The present invention increases the capacity of a landfill. The volume of the landfill that was previously occupied by the decomposed waste, is now available for re-use and may be filled by additional sold waste. In a preferred embodiment of the invention, the method of landfill mining comprises the following steps: (1) converting the landfill to aerobic production by injection of moisture and air, and a raw material such as sewage sludge (if required), thereby increasing the rate of waste decomposition; (2) excavating the landfill to remove material; (3) separating the removed material to substantially isolate at least one segregated material from the residual material; (4) disposing of at least one segregated material; and (5) returning the residual material to the landfill. The segregated material preferably includes decomposed waste and recyclables, and may also include toxic material and hazardous waste.

DETAILED DESCRIPTION OF THE INVENTION

Figure 1:
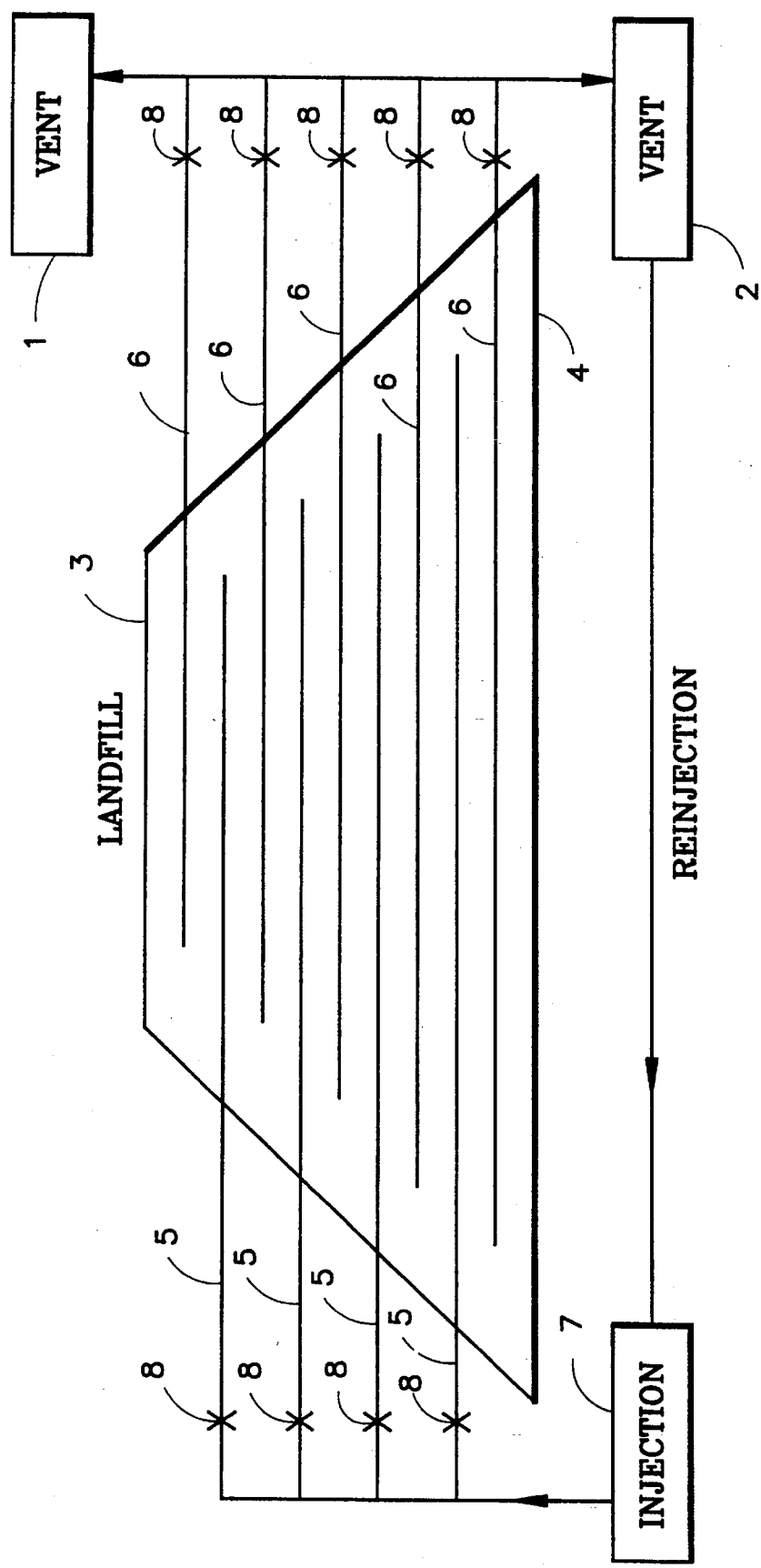
FIG. 1 is schematic section view of a landfill.

Solid waste is produced at a steadily increasing rate around the world. There are numerous methods for dealing with the disposal of solid waste. One of the primary methods is the landfill. Generally speaking, the use of a landfill to dispose of solid waste includes the following steps: location of the site of the landfill; purchase or lease of the land; excavation of the land to produce suitable receiving cells; placing solid waste on the prepared cells; and after the cells have been filled to the maximum height, covering the cells and closing the landfill. A number of these steps are quite complex. For example, selecting the correct site involves consideration of the soils both on the surface and in the location of the proposed cells, evaluation of ground water patterns around the proposed site, and reviewing input from those who would be affected by a landfill at the proposed site. The excavation of the cells may include the additional step of lining the cells with a particular type of soil and plastic liner, before depositing solid waste in the cell.

Before the present invention, one of the primary problems with landfills was the fact that the capacity (called "air space") would become exhausted. This would create the need to open a new landfill, as well as maintain the existing landfill during closure. The present invention may reduce or eliminate these problems by increasing the capacity of existing landfills.

In one form, the present invention comprises the step of converting an existing landfill to an aerobic processor, and then selectively excavating the landfill to remove decomposed waste, thereby increasing the capacity of the landfill.

In the preferred embodiments, there are additional steps to improve the efficacy of the invention.

In a preferred embodiment, the landfill is converted to aerobic production. Most landfills are designed to be anaerobic, in which the landfill is designed to be dry tomb, devoid of air and moisture. The conversion of such a conventional landfill from anaerobic to aerobic production, requires the injection of air and moisture into the landfill, in order to maximize the rate of waste decomposition. The aerobic production converts most of the waste in the landfill, which is comprised mainly of organic materials, into a useful product. The resulting processed soil/compost may then be excavated and used for a number of purposes. For example, the excavated, processed soil/compost may be sold as a soil amendment, or may be used as landfill cover.

The injection of moisture and air into a landfill substantially increases the rate of decomposition of the organic materials. The reaction rate may be increased by a factor of ten (10) or more by injection of appropriate amounts of air and moisture, depending on the composition of the material in the cell of the landfill, the age of the landfill, the conditions under which the landfill was maintained in the past, and other factors. The injection of moisture into the landfill is preferably carried out to achieve from about 50% to about 70% water and from about 30% to about 50% solids by weight in the cell. More preferably, the injection of moisture into the landfill is carried out to achieve about 60% water and about 40% solids by weight in the cell. The injection of air into the landfill is preferably carried out to achieve a temperature of from about 140° to about 180° F. (about 60° to about 82° C.) in the cell of the landfill. More preferably, the injection of air into the landfill is carried out to achieve a temperature of about 170° F. (about 77° C.) in the cell of the landfill.

Since the landfill is large and self insulating, a cooling mechanism must be included to carry off the heat of the aerobic composting reaction. This is done by injecting the water first to achieve from about 50% to about 70% and preferably about 60% (by weight) level. Then the air injection can commence always making sure that the exhaust gases are from about 5% to about 15%, and preferably about 10% oxygen (dry basis) or twice the stoichiometric requirement of the composting reaction. The heat of reaction will turn the injected water into water vapor that will be carried off by the fixed gases, nitrogen, oxygen and carbon dioxide. If the temperature increases above from about 140° to about 180° F. (about 60° to about 82° C.), and preferably about 170° F. (about 77° C.), then additional air and water as needed may be injected. If the temperature falls below about 170° F. (about 77° C.), then raw materials such as fertilizing materials and sewage sludge can be added to the injection. This increases nitrogen to carbon ratio and thereby the rate of biological composting reaction. The aerobic reaction can be further stabilized by the reinjection of the leachate drained from the landfill along with the make-up water as required.

The specific design of the apparatus for the injection of air and water into the landfill to promote the aerobic composting reaction will vary with the specific requirements of the landfill to be treated. The general design of a preferred embodiment as shown in FIG. 1 includes the venting 1 of depleted air and water vapor at the top of the landfill and the venting 2 of depleted air, water vapor and leachate at the bottom. Each is accomplished with a series of perforated pipes in roughly planar form conforming to the top 3 and bottom 4 of the landfill. The pipes are spaced about 10 feet (about 3 meters) apart depending on the density of the waste to be processed. Between these two vent planes are placed alternating injection 5 and vent 6 planes of pipes at about ten foot (about three meters) horizontal and/or diagonal spacing. The perforated injection pipes carry air, make-up water, and leachate with sludge injection 7 as needed to maintain the desired reaction rate. The piping system may be valved 8 so that different parts of the cell can be treated with greater or lesser flows in order to accommodate variations in refuse properties especially in large thick cells. The flow programming of the injection into the landfill is preferably based on the measurement of temperature in the cell, and on the oxygen/carbon dioxide content of the off gas from the cell. The measurement of temperature is preferably taken at a plurality of locations in the cell. Depending on the nature of the landfill and the cell, an instrumentation pipe with a plurality of temperature and/or oxygen ($O_2$) sensors, such as one sensor placed about every two feet (about 0.6 meter) along the length of the pipe may be inserted into an injection or vent pipe to determine the temperature profile in the refuse mass adjacent to the installed pipe as required. A log of the temperature readings at each location and the oxygen/carbon dioxide content of the off gas at each location is preferably kept so as to monitor the refuse mass in the cell of the landfill. There must be careful monitoring to insure that an adequate rate of decomposition is achieved throughout the cell, while avoiding the ignition temperature of the refuse mass. Depending on the circumstances, the temperature of the refuse mass may be reduced by injecting additional air at a higher rate, and additional moisture at a higher rate, so as to cool the refuse mass. The constant monitoring of the temperature of the refuse mass and the oxygen/carbon dioxide content of the off gas is required in part because the composition and density of the refuse mass is usually not known with sufficient certainty and specificity, so as to allow advance planning of the precise rate of injection and the precise places of injection of air and moisture into the cell of the landfill.

The excavation of the landfill is preferably followed by a separation of the excavated materials. The separation will preferably separate the processed soil/compost from recyclable materials, and from any toxic materials and hazardous waste, thereby leaving the residual material. The recyclable materials such as glass, aluminum cans, iron materials and certain plastics, may then be recycled. Any hazardous waste and toxic materials found during the excavation may be processed (including bioprocessed) to contain or dispose of them in accord with known methods, and in accord with government regulations. The residual materials may be returned to the landfill.

In the present invention, the step of separating the material that is removed from the cell of the landfill, is carried out to substantially isolate at least one segregated material from the residual material. The primary segregated material is decomposed waste. Other segregated materials depend on the nature of the landfill and may include recyclables, toxic materials, hazardous waste and other items. The segregated material is regarded as substantially isolated when the separation has been carried out to an extent that allows the segregated material to be used for its intended purpose or further processed. For example, if under the circumstances iron materials must be separated from aluminum cans in order to be suitable for recycling, then the separation must be carried out to this extent.

Some landfills were built using former technologies that have been replaced by better technologies. For example, a number of older landfills were not lined before the solid waste was placed into the cells. One embodiment of the invention for such landfills includes aerobic processing, excavating the landfill, removing all material in the landfill, and then lining the landfill cells. Subsequently, the residual materials may be returned to the cells. The new capacity of the landfill may then be filled with new solid waste.

The present invention may allow the revitalization of some existing landfills that have been closed because the capacity was exhausted. This may result in additional environmental benefits. For example, if the closed landfill is located closer to the source of the solid waste, as compared to the currently operating landfill, then the revitalization of the formerly closed landfill under the method of the present invention could result in transportation of the solid waste over a shorter distance. This could result in less air pollution from trucks and other vehicles used to transport the solid waste.

Additional advantages of the invention include the elimination of methane and other noxious gases from the gases produced by the decomposition of the organic materials. This greatly reduces the risk of fire and explosion at the landfill and in adjacent communities. Another advantage resulting from the shift from anaerobic to aerobic decomposition in the landfill is the elimination of offensive odors, both during the decomposition and in the subsequent mining operation.

The process of the present invention may be carried out in single applications, or continuously. A single application of the process may be more suitable for a small landfill. The process of the invention could be carried in a small landfill, thereby increasing the capacity, which could be used for disposal of additional solid waste. For a larger landfill, the active area may be divided into a number of cells to be processed sequentially and continuously. For example, the first cell may be in aerobic production by the injection of moisture and air. The second cell may be in the process of excavation to remove materials. The third cell may be in the process of lining the cell to comply with current standards and technology. The fourth cell may be in the process of being filled by additional solid waste.

Variations of the invention may be envisioned by those skilled in the art and the invention is to be limited solely by the claims appended hereto.

I claim:

1. A method of landfill mining comprising the following steps:
   (1) converting a landfill to aerobic production by injection of moisture and air and venting of depleted air and moisture, thereby increasing the rate of waste decomposition;
   (2) excavating the landfill to remove material;
   (3) separating the removed material to substantially isolate a segregated material thereby leaving residual material;
   (4) disposing of said segregated material; and
   (5) returning said residual material to the landfill.

2. The method of claim 1, wherein said injection of moisture and air is carried out to achieve from about 50% to about 70% water and from about 30% to about 50% solids by weight in a cell of said landfill.

3. The method of claim 2, wherein said injection of moisture and air is carried out to achieve a temperature of from about 140° to about 180° F. (about 60° C. to about 82° C.) in a cell of said landfill.

4. The method of claim 1, wherein said injection of moisture and air is carried out to achieve about 60% water and about 40% solids by weight in a cell of said landfill, and to achieve a temperature of about 170° F. (about 77° C.) in said cell of said landfill, and wherein said segregated material is selected from the group consisting of decomposed waste and recyclables.

5. The method of claim 1, wherein said venting further comprises venting a leachate.

6. The method of claim 5, where the venting of depleted air, water vapor, and leachate is accomplished through a plurality of perforated pipes placed in the landfill.

7. The method of claim 1, wherein said injection further comprises the injection of a leachate and a raw material.

8. The method of claim 7, where the injection of air, water, leachate and raw material is accomplished through a plurality of perforated pipes placed in the landfill.

9. The method of claim 1, wherein said injection comprises a plurality of perforated injection pipes in a plurality of injection planes, and a plurality of perforated venting pipes in a plurality venting planes, and said injection planes alternate with said venting planes.

10. The method of claim 9, wherein said injection planes and venting planes are horizontal and diagonal.

11. The method of claim 1, further comprising a plurality of perforated venting pipes in an upper plane at the top of said landfill, and a plurality of perforated venting pipes in a lower horizontal plane at the bottom of said landfill.

12. The method of claim 1, wherein said injection of air is controlled to keep the composition of said depleted air to from about 5% to about 15% oxygen.

13. The method of claim 1, wherein said injection further comprises the injection of a raw material.

14. The method of claim 13, wherein said raw material is sewage sludge.

15. A method to improve the rate of waste decomposition in a landfill comprising the following step: injecting moisture and air, into at least one cell in a landfill to convert said cell to aerobic production, thereby increasing the rate of waste decomposition, while keeping the temperature of the contents of said cell below its ignition point, wherein said injecting is carried out to achieve about 60% water and about 40% solids by weight in said cell of said landfill, and to achieve a temperature of about 170° F. (about 77° C.) in said cell of said landfill.

16. The method of claim 15, wherein said injection further comprises the injection of a leachate and a raw material.

17. The method of claim 15, wherein said method further comprises selectively venting depleted air and moisture, and said injection of air is controlled to keep the composition of said depleted air to from about 5% to about 15% oxygen.

18. A method of controlling the temperature in a landfill that comprises selectively injecting air and water, selectively venting depleted air and moisture, and said injection of air is controlled to keep the composition of said depleted air to from about 5% to about 15% oxygen.

* * * * *